(12) United States Patent
Blum et al.

(10) Patent No.: US 7,963,474 B2
(45) Date of Patent: Jun. 21, 2011

(54) BELT RETRACTOR FOR A VEHICLE SAFETY BELT

(75) Inventors: Herbert Blum, Schwaebisch Gmuend (DE); Bernd Gentner, Ellwangen (DE); Thomas Kielwein, Eschach (DE)

(73) Assignee: TRW Automotive GmbH, Alfdorf (DE)

( * ) Notice: Subject to any disclaimer, the term of this patent is extended or adjusted under 35 U.S.C. 154(b) by 1218 days.

(21) Appl. No.: 11/087,025

(22) Filed: Mar. 22, 2005

(65) Prior Publication Data
US 2006/0163410 A1    Jul. 27, 2006

(30) Foreign Application Priority Data

Mar. 31, 2004   (DE) .......................... 10 2004 015 825

(51) Int. Cl.
  *B60R 22/28* (2006.01)
  *B65H 75/48* (2006.01)
(52) U.S. Cl. .................. 242/379.1; 242/381.1; 280/805; 297/472
(58) Field of Classification Search ............... 242/379.1, 242/382, 381.1, 384.2; 280/805; 297/472, 297/474; *B60R 22/28, 22/34, 22/36*
See application file for complete search history.

(56) References Cited

U.S. PATENT DOCUMENTS

| | | | | |
|---|---|---|---|---|
| 369,159 A | * | 8/1887 | Burns | 192/46 |
| 489,120 A | * | 1/1893 | Bernstrom | 37/207 |
| 6,241,172 B1 | * | 6/2001 | Fugel et al. | 242/379.1 |
| 6,416,008 B1 | * | 7/2002 | Fujii et al. | 242/379.1 |
| 6,439,493 B1 | * | 8/2002 | Specht et al. | 242/379.1 |
| 6,481,660 B2 | * | 11/2002 | Nagata et al. | 242/379.1 |
| 6,669,133 B2 | * | 12/2003 | Palliser et al. | 242/379.1 |
| 6,969,022 B2 | * | 11/2005 | Bell et al. | 242/379.1 |
| 2010/0096902 A1 | * | 4/2010 | Hiramatsu et al. | 297/472 |

FOREIGN PATENT DOCUMENTS

JP    2003137065 A    *   5/2003

* cited by examiner

*Primary Examiner* — Michael R Mansen
*Assistant Examiner* — Stefan Kruer
(74) *Attorney, Agent, or Firm* — Tarolli, Sundheim, Covell & Tummino LLP

(57) ABSTRACT

A belt retractor for a vehicle safety belt has a frame, a belt spool for the safety belt which is rotatably arranged in the frame, a locking disc which is arranged on the belt spool and is connected therewith through an energy absorption element, and a blocking mechanism which allows to block the locking disc against a rotation in the unwinding direction of the safety belt in the frame. A detent is provided which is movably arranged in the belt spool and can prevent a rotation of the locking disc relative to the belt spool as a function of its position.

9 Claims, 18 Drawing Sheets

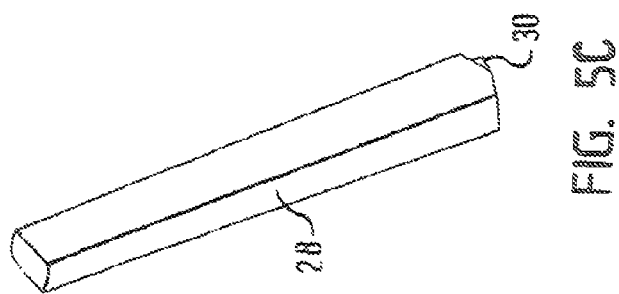
FIG. 5C
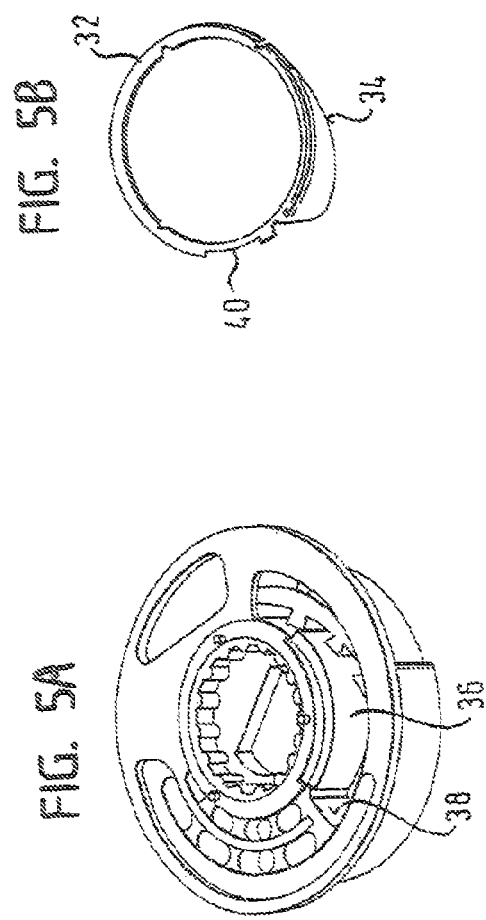
FIG. 5B
FIG. 5D
FIG. 5A

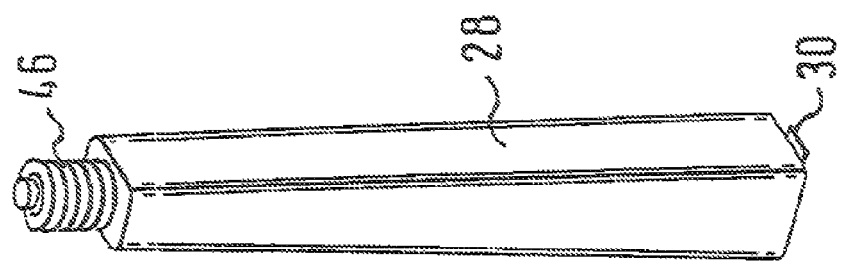
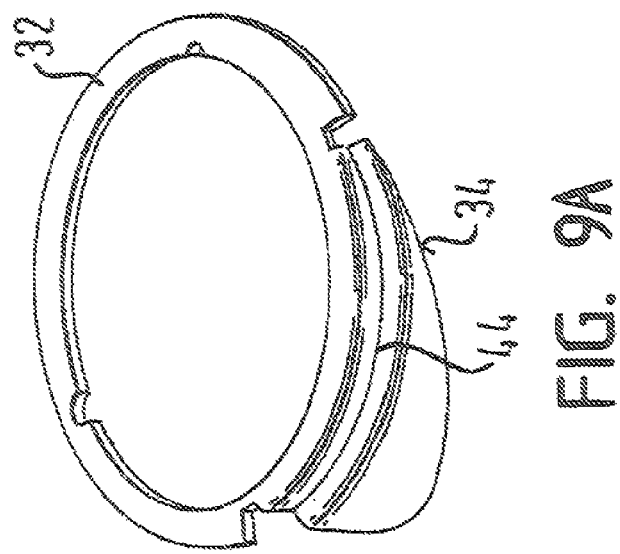
FIG. 9B
FIG. 9A

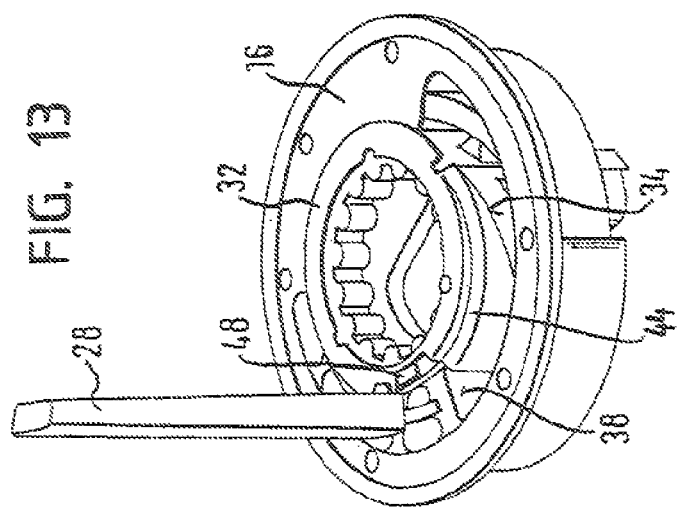
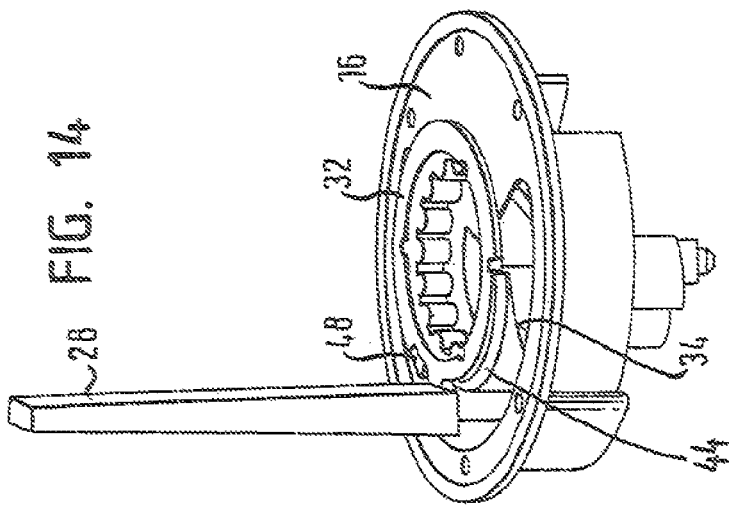
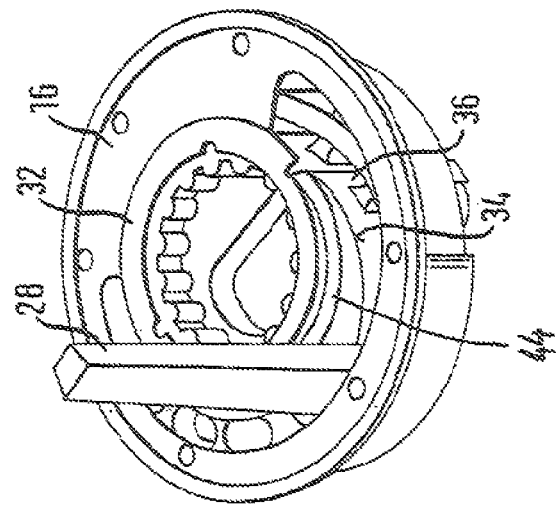
FIG. 13
FIG. 14
FIG. 15

BELT RETRACTOR FOR A VEHICLE SAFETY BELT

The invention relates to a belt retractor for a vehicle safety belt, with a frame, a belt spool for the safety belt which is arranged rotatably in the frame, a locking disc which is arranged on the belt spool and is connected therewith by means of an energy absorption element, and a blocking mechanism by means of which the locking disc can be blocked against a rotation in the unwinding direction of the safety belt in the frame.

BACKGROUND OF THE INVENTION

When the locking disc is blocked against a rotation in the unwinding direction of the safety belt in the frame, initially no safety belt can be withdrawn from the belt retractor. This ensures that a vehicle occupant who is wearing the safety belt, takes part as early as possible in a vehicle deceleration. In order to prevent the forces exerted here onto the vehicle occupant by the safety belt from assuming undesirably high levels, the energy absorption element makes possible a relative rotation between the belt spool and the locking disc when a particular traction force is exceeded in the safety belt. This is generally known under the designation "force limitation".

It is also known that the extent of the relative rotation between the belt spool and the locking disc is to be limited. In this way, the maximum possible forward movement which a vehicle occupant undergoes during a force limitation function of the belt retractor, is limited to a value which is recognized as being non-critical. For this, it is known in the prior art to provide a pin on the belt spool, which after a relative rotation between the belt spool and the locking disc of slightly less than one revolution arrives in abutment against a detent which is provided on the locking disc. For geometric reasons, in such a construction the maximum possible relative rotation between the belt spool and the locking disc is limited to an angle range which corresponds to 360 degrees minus the angle range assumed by the pin and the angle range assumed by the detent.

The object of the invention consists in further developing a belt retractor of the type initially mentioned, to the effect that the prerequisite for a greater relative rotation between the belt spool and the locking disc is provided, whilst a reliable limitation of the relative rotation is maintained.

BRIEF DESCRIPTION OF THE INVENTION

To solve this problem, in accordance with the invention a detent is provided, which is arranged movably in the belt spool and can prevent a rotation of the locking disc relative to the belt spool as a function of its position. The adjustable arrangement of the detent opens up a variety of new construction possibilities. In an embodiment which is intended to make possible just one single revolution of the belt spool relative to the control ring, the permissible angle range can be increased compared with constructions according to the prior art by the angle range which the detent assumes in the prior art. In addition, it is not necessary to provide a groove in the locking disc for the detent extending over approximately 360 degrees, so that a higher strength results. When more than one revolution of the belt spool relative to the locking disc is desired, the detent can be moved via an intermediate position which is assumed for example after approximately one revolution, fully into its operating position so that it becomes effective at the end of the second revolution of the belt spool relative to the locking disc. The intermediate position can either be brought about by a suitably developed cam or by a spacer.

Advantageous aspects of the invention will be apparent from the sub-claims.

BRIEF DESCRIPTION OF THE DRAWINGS

The invention is described below with the aid of various embodiments which are illustrated in the enclosed drawings. In these:

FIGS. 5a-5d show in diagrammatic, perspective views the components of the assembly shown in FIG. 2 with the exception of the energy absorption element;

FIGS. 9a-9b show in perspective views a cam and a detent, respectively, for a belt retractor according to a second embodiment of the invention;

FIG. 13 shows in a view corresponding to that of FIG. 10 a locking disc together with cam and detent for a belt retractor according to a third embodiment of the invention, the detent being in its position of rest;

FIG. 14 shows a view corresponding to that of FIG. 13, the detent being in its intermediate position;

FIG. 15 shows a view corresponding to that of FIG. 13, the detent being in its operating position;

DETAILED DESCRIPTION OF THE INVENTION

Figure 1:
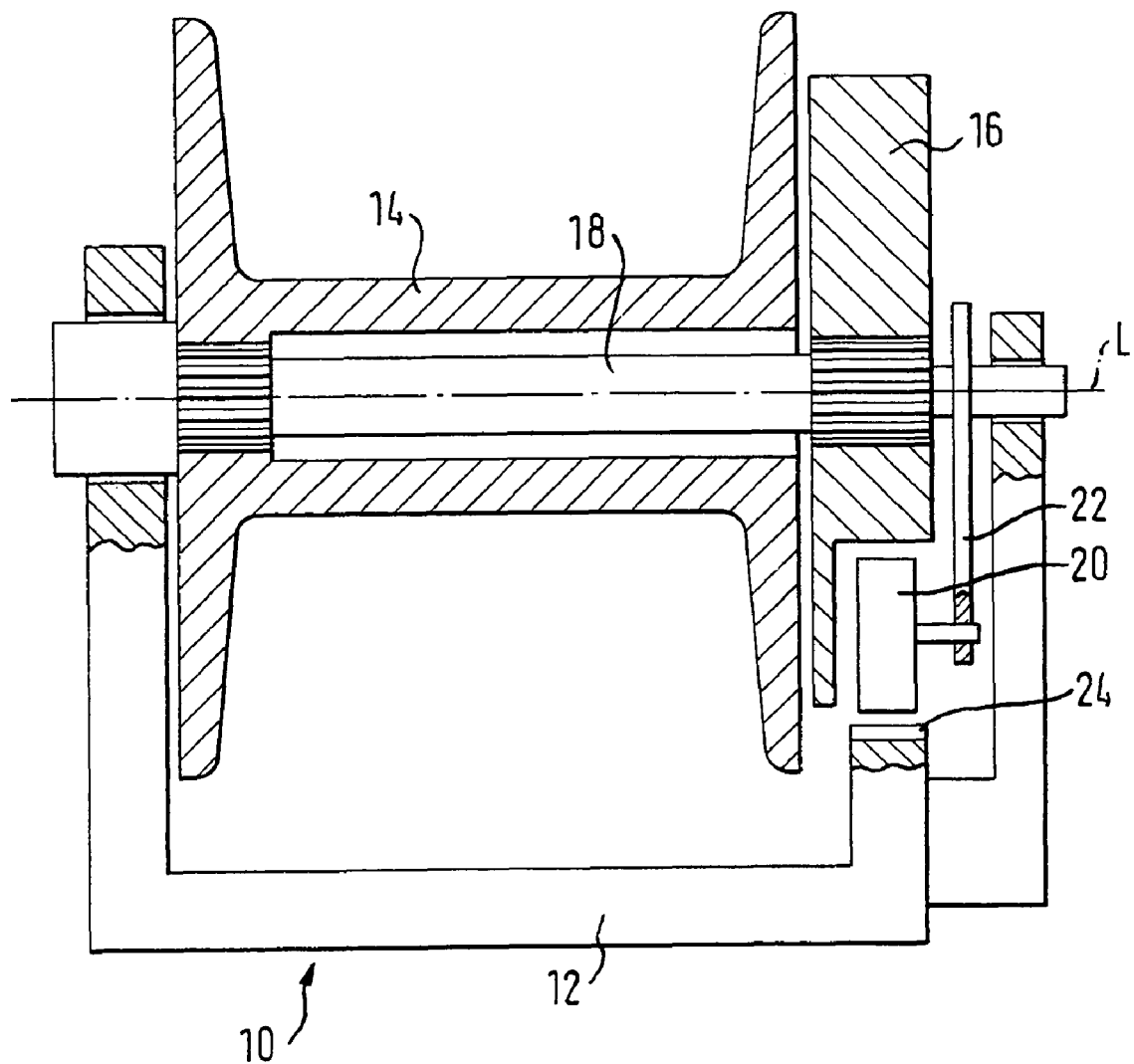
FIG. 1 shows a diagrammatic section through a belt retractor according to the invention.

In FIG. 1 a belt retractor 10 is shown diagrammatically, which has a frame 12 in which a belt spool 14 is rotatably mounted. A vehicle safety belt (not illustrated) can be wound on the belt spool 14. On an end face of the belt spool 14, a locking disc 16 is arranged, which is coupled with the belt spool 14 by an energy absorption element 18 which is constructed here as a torsion rod. The torsion rod 18 is connected at one axial end with the belt spool 14 so as to be secure with regard to rotation, and is connected at its other axial end with the locking disc 16 so as to be secure with regard to rotation. On the locking disc a blocking catch 20 is mounted, which can be actuated by a blocking mechanism 22 which is only illustrated here diagrammatically. In the initial state, the blocking catch 20 is in a radially inwardly swiveled position, in which the locking disc 16, and hence also the belt spool 14, is rotatable relative to the frame 12. The blocking mechanism 22 can swivel the blocking catch 20 radially outwards so that it engages into blocking teeth 24, illustrated diagrammatically here, on the frame 12. Thereby, the locking disc 16 and (via the torsion rod 18) also the belt spool 14, is blocked against a rotation in the unwinding direction of the safety belt. This construction is generally known from the prior art. It is likewise known that the blocking catch 20 can be mounted on the frame 12 and can be guided into blocking teeth which are provided on the outer periphery of the locking disc 16.

With the aid of FIGS. 2 to 8, a first embodiment of the belt retractor is now described. The belt spool 14 is provided with a mounting 26, in which a detent 28 is displaceably arranged. The detent 28 has the form of a pin with a rectangular cross-section (see also FIG. 5C) and is provided at an axial end with a cam 30. The detent 28 is displaceably arranged in the mounting 26, the cam 30 being arranged towards the locking disc 16.

Figure 2:
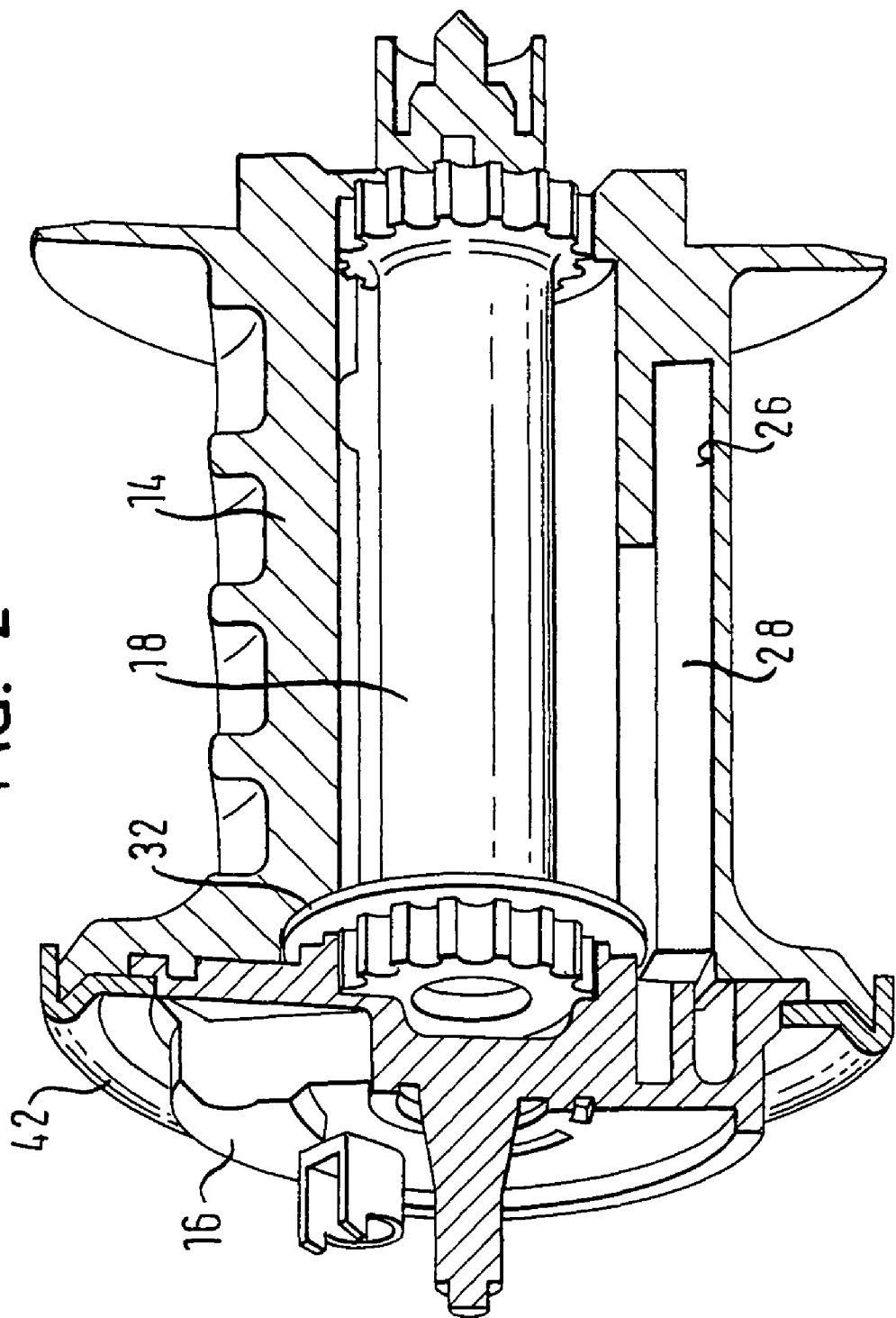
FIG. 2 shows a perspective view, partially in section, of a belt spool with locking disc arranged thereon, detent and energy absorption element according to a first embodiment.
Figure 3:
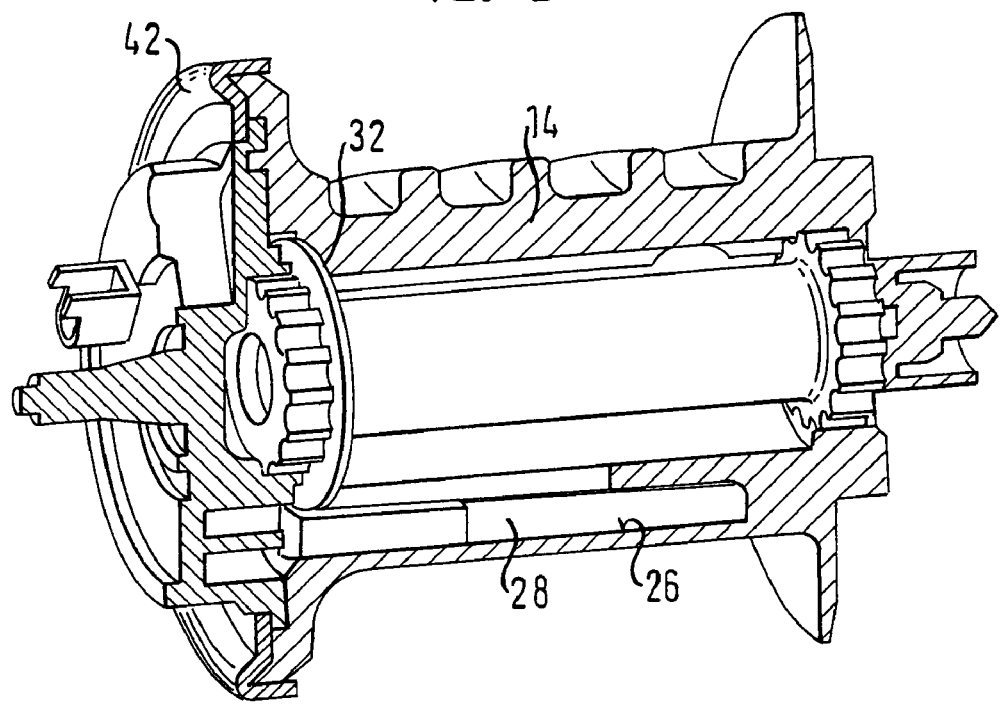
FIG. 3 shows in a view corresponding to that of FIG. 2 the detent in its position of rest.
Figure 4:
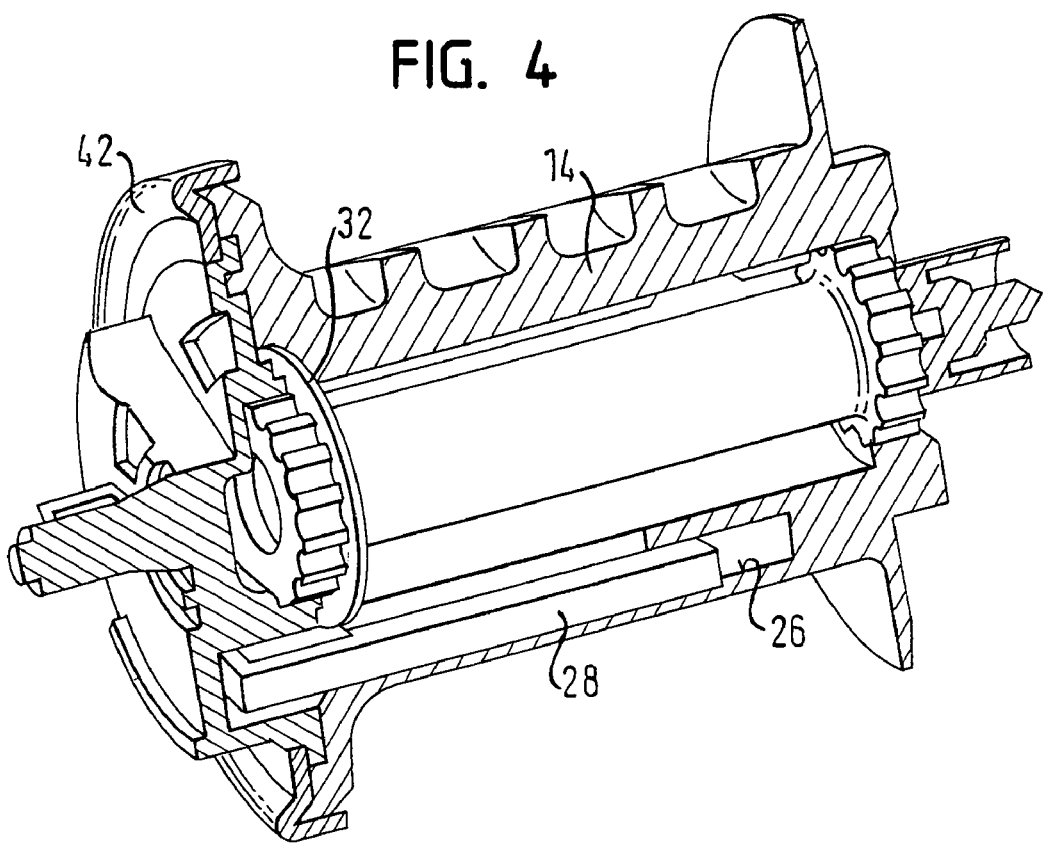
FIG. 4 shows in a view corresponding to that of FIG. 2 the detent in its operating position.
Figure 6B:
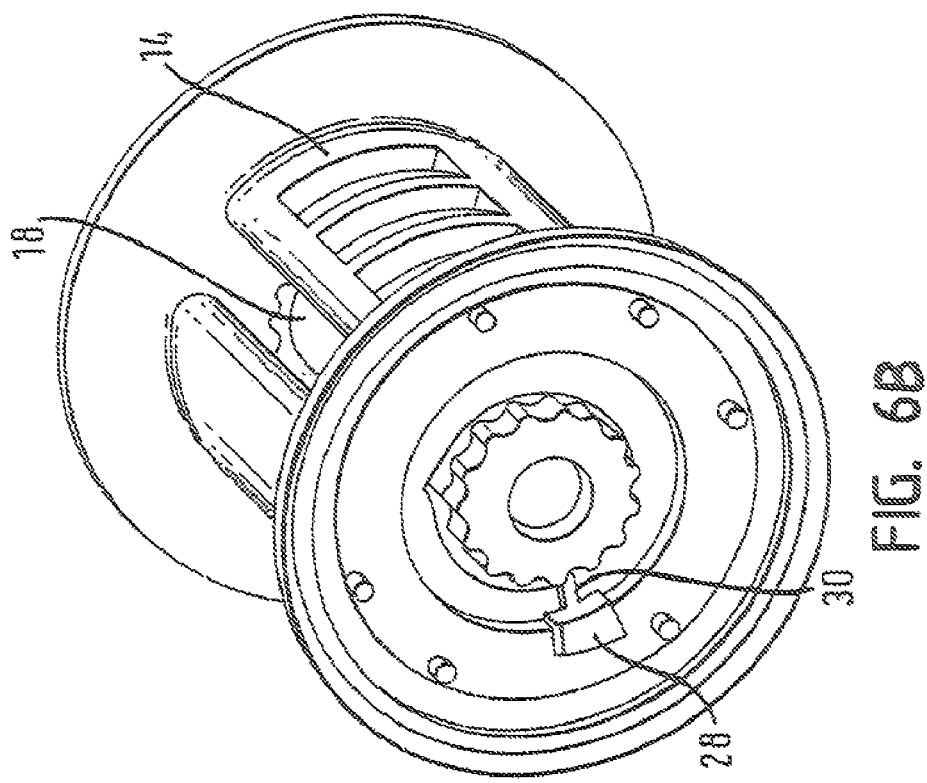
FIGS. 6a-6b show the assembly of FIG. 2 in an intermediate state during installation.
Figure 6A:
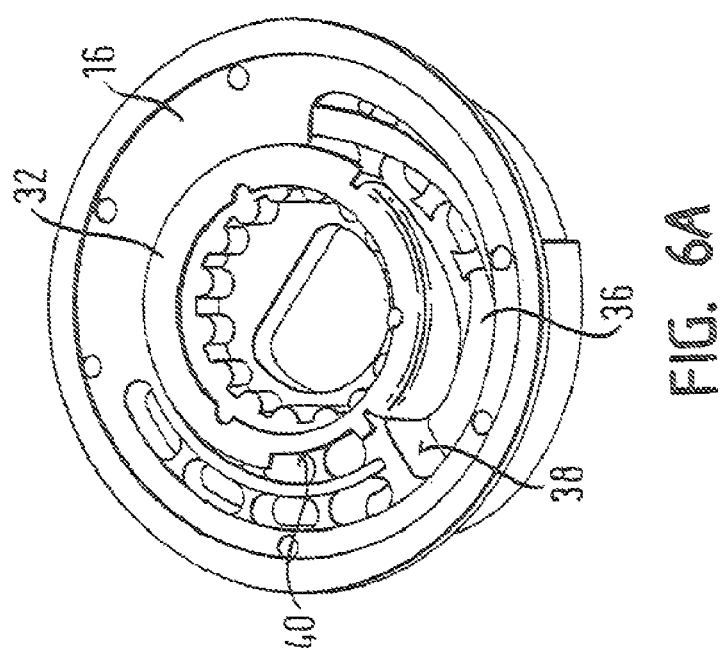
Figure 8:
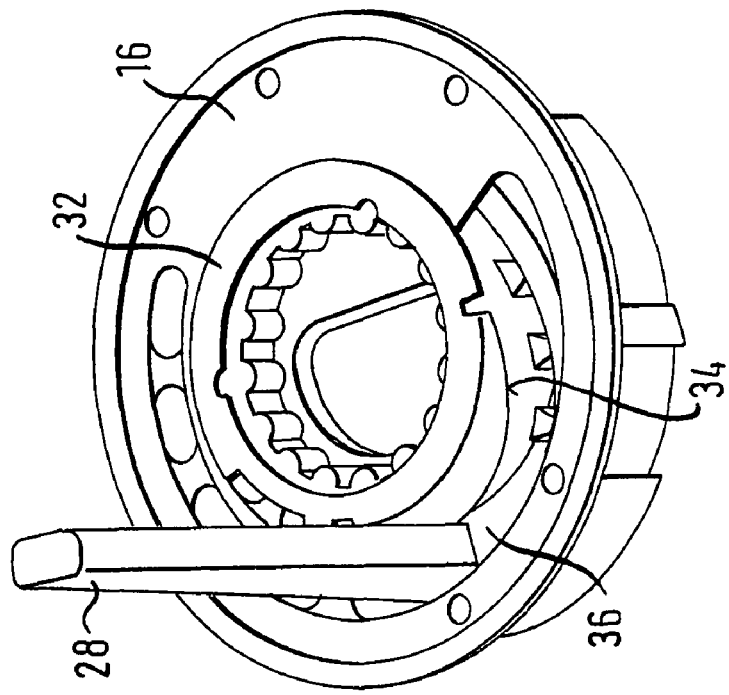
FIG. 8 shows a view corresponding to that of FIG. 7, the detent being in its operating position.
Figure 7:
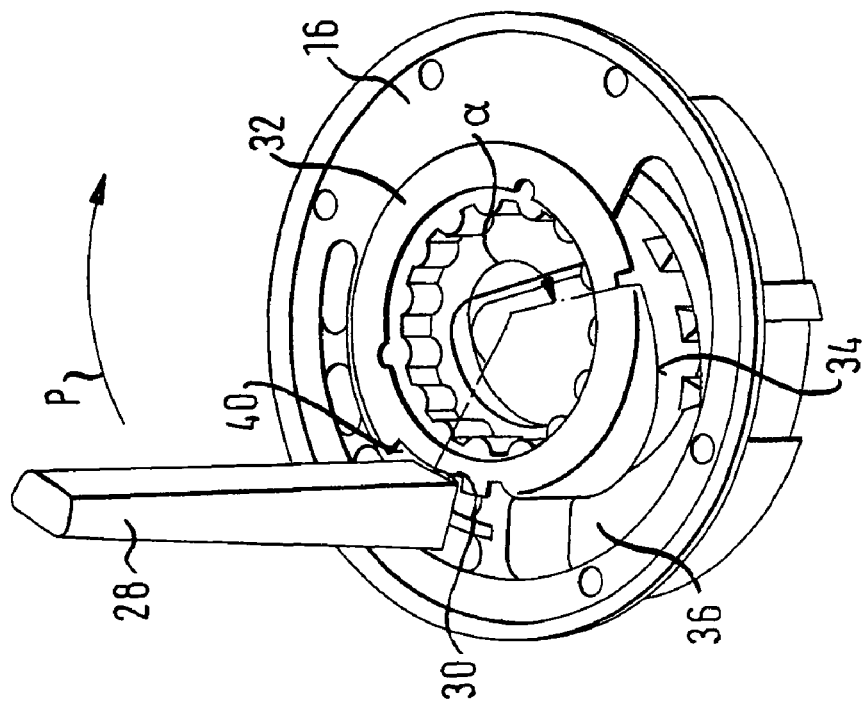
FIG. 7 shows a perspective view of the control ring, used in the assembly of FIG. 2, together with the detent, the latter being in its position of rest.
Figure 10:
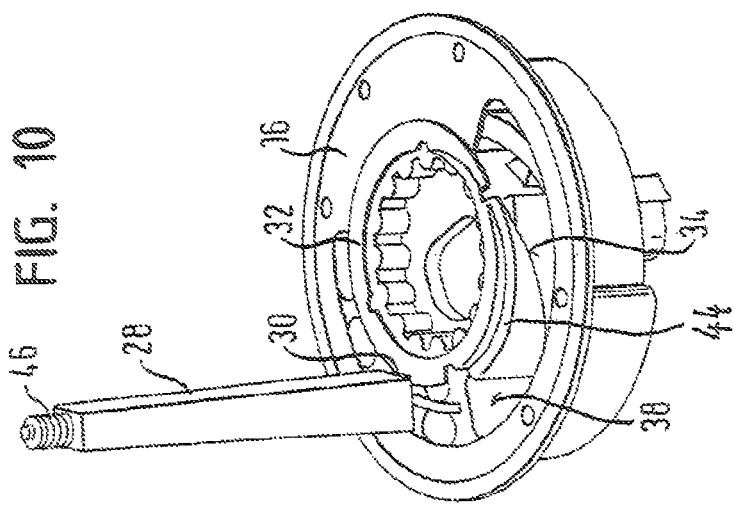
FIG. 10 shows in a perspective view a locking disc with the cam and the detent according to the second embodiment, the detent being in the position of rest.
Figure 11:
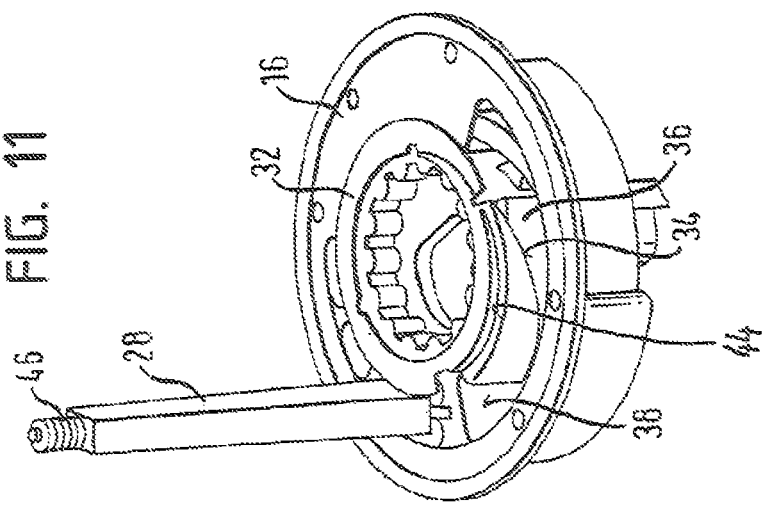
FIG. 11 shows a view corresponding to that of FIG. 10, the detent being in an intermediate position.
Figure 12:
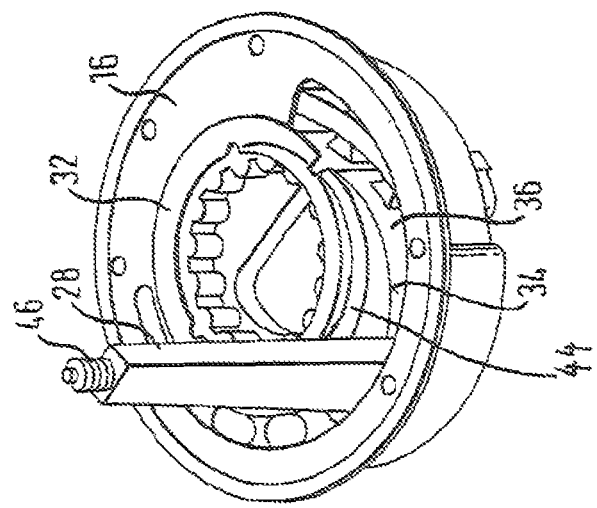
FIG. 12 shows a view corresponding to that of FIG. 10, the detent being in its operating position.

To move the detent 28 between a position of rest which is illustrated in FIGS. 2, 3 and 7, and an operating position which is illustrated in FIGS. 4 and 8, a control ring 32 is used, which is provided with a control link 34. The control link 34 is constructed here as a ramp surface, running obliquely, on a shoulder of the control ring 32, which is bent from the plane of the ring by approximately 90 degrees. The control link 34 therefore acts in axial direction in relation to the control ring.

The control ring 32 is arranged on the locking disc 16 so as to be secure with regard to rotation, the control link 34 being directed to the outer side of the assembly formed by the belt spool 14 and the locking disc 16. The control link 34 comes to lie here in a recess 36 of the locking disc 16. One end of the recess 36 is formed by a detent surface 38 which here is the surface on the end side at the end of the recess.

On installation of the assembly consisting of belt spool 14 and locking disc 16, the locking disc 16, provided with the control ring 32, is placed onto the belt spool 14, provided with the detent 28, so that the cam 30 dips through a window 40 in the control ring 32 (see in particular FIG. 7). Viewed in axial direction along the longitudinal axis L of the belt spool 14, the cam 30 therefore lies further outwards than the control ring 32. After the arranging of the locking disc 16 on the belt spool 14, the two parts are fastened to each other by a ring 42 which is put in place (see in particular FIG. 2).

When, with a blocked locking disc 16, a torque is exerted onto the belt spool 14 via the safety belt, which is greater than the resistance moment provided by the torsion rod 18, a relative rotation of the belt spool 14 relative to the locking disc 16 is brought about. Here, the detent 28 is moved relative to the locking disc 16 and the control ring 32, arranged thereon, in the direction of the arrow P of FIG. 7, whereby the cam 30 is moved in a free space between the control ring 32 and the locking disc 16. Here, the detent 28 remains in its position of rest until the cam 30 has reached the beginning of the control link 34 (see angle range $\alpha$ in FIG. 7). The control link 34 draws the detent 28 by means of the cam 30 in axial direction out from the belt spool 14 into the recess 36, until the detent 28 has reached its operating position. In this position, after continued relative rotation between the belt spool 14 and the locking disc 16, it arrives in abutment against the detent surface 38. Thereby, a further relative rotation between the belt spool and the locking disc is prevented.

The advantage of this embodiment consists in that the recess 36 for the detent only has to extend over a very small angle range of the locking disc 16, which leads to a particularly high strength. In addition, in this way, the possibility is provided for providing a pocket in the region of the locking disc 16 lying approximately diametrically opposite the recess 36, in which pocket the blocking catch 20 is arranged.

With the aid of FIGS. 9A to 12, a belt retractor according to a second embodiment is now described. The same reference numbers are used for the components known from the first embodiment, and in this respect reference is to be made to the above explanations.

The difference between the first and the second embodiment consists substantially in that in the second embodiment approximately two revolutions of the belt spool 14 relative to the locking disc 16 are permitted, before the detent 28 becomes effective. For this purpose, the control ring 32 is provided approximately in the region of the control link 34 with a transition section 44, which is formed by a slope running with a slight inclination, the height difference of which between start and end amounting to approximately the sum of the material thickness of the control ring 32 and the "height" of the cam 30 measured in axial direction. In addition, a compression spring 46 is provided, which rests between the stop 28 and the base of the mounting 26 and acts on the detent 28 out from the belt spool 14 towards the locking disc 16.

In the initial position (see FIG. 10), the cam 30 rests on the side of the control ring 32 which faces the belt spool 14. After an approximately ¾ revolution of the belt spool 14 relative to the locking disc 16, the cam 30 reaches the transition section 44, so that it is moved under the action of the compression spring 46 in axial direction outwards out from the belt spool 14. During the now subsequent second revolution of the belt spool 14 relative to the locking disc 16, the cam, viewed from the belt spool 14, is situated "behind" the control ring 32, i.e. between the control ring 32 and the locking disc 16. The cam 30 is guided there by a suitable contact surface on the locking disc 16. Shortly before completion of the second revolution, the detent 28 enters into the recess 36 of the locking disc 16. In this, it is moved further out from the belt spool 14 in axial direction, either by cooperation of the control link 34 with the cam 30 or under the action of the compression spring 46, until it is in its operating position and can arrive in abutment against the detent surface 38. Thereby, a further relative rotation between the belt spool 14 and the locking disc 16 is prevented after just two revolutions.

In FIGS. 13 to 15 a control ring 32 is shown together with locking disc 16 and detent 28 for a belt retractor according to a third embodiment. The difference from the second embodiment consists substantially in that no compression spring is necessary for moving the detent 28. To transfer the detent 28 from its position of rest into the intermediate position, a guide tongue 48 is used, onto which the cam 30 of the detent 28 runs after the belt spool 14 has covered just one revolution relative to the locking disc 16. The guide tongue 48 is placed obliquely, so that it moves the cam 30 in axial direction, whereby the cam 30 on the second revolution of the belt spool 14 relative to the locking disc 16 comes to lie between the control ring 32 and the locking disc 16. Proceeding from there, it is then moved by the control link 34 fully into the recess 36, so that it can arrive in abutment against the detent surface 38 and prevents a further relative rotation.

Figure 16:
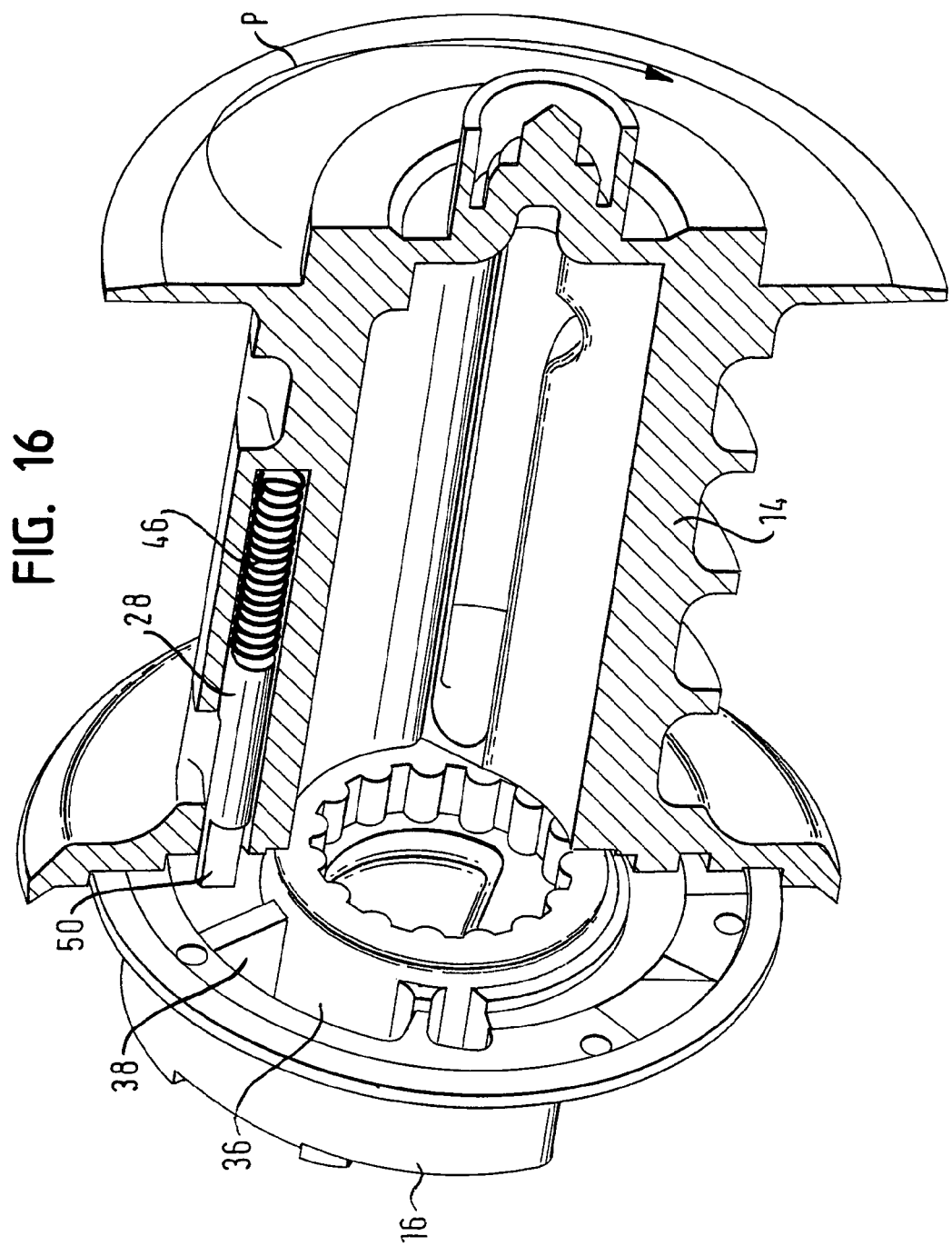
FIG. 16 shows in a diagrammatic perspective view, partially in section, an assembly consisting of locking disc and belt retractor for a belt retractor according to a fourth embodiment of the invention, the detent being in its position of rest.
Figure 17:
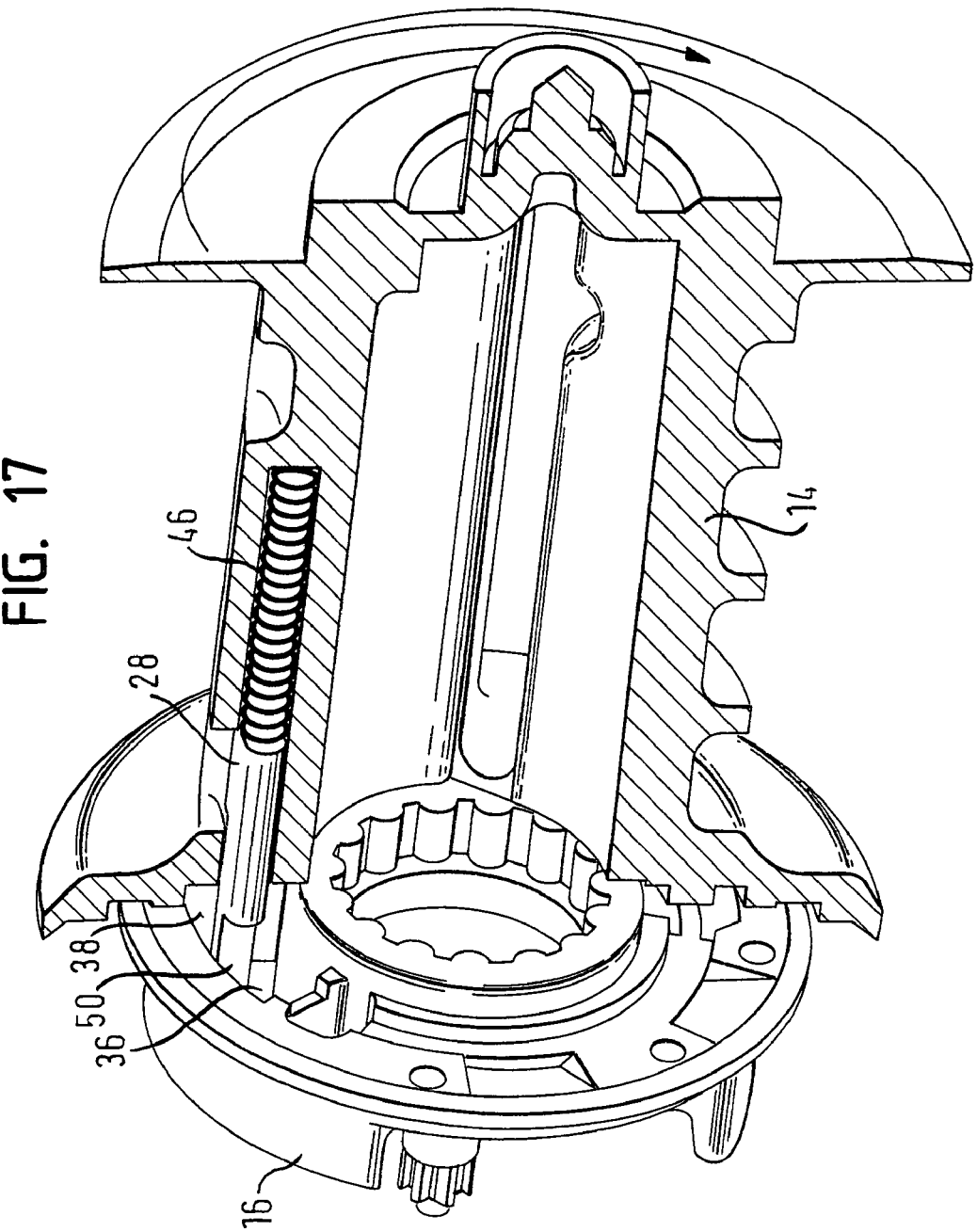
FIG. 17 shows a view corresponding to that of FIG. 16, the detent being in its intermediate position.
Figure 18:
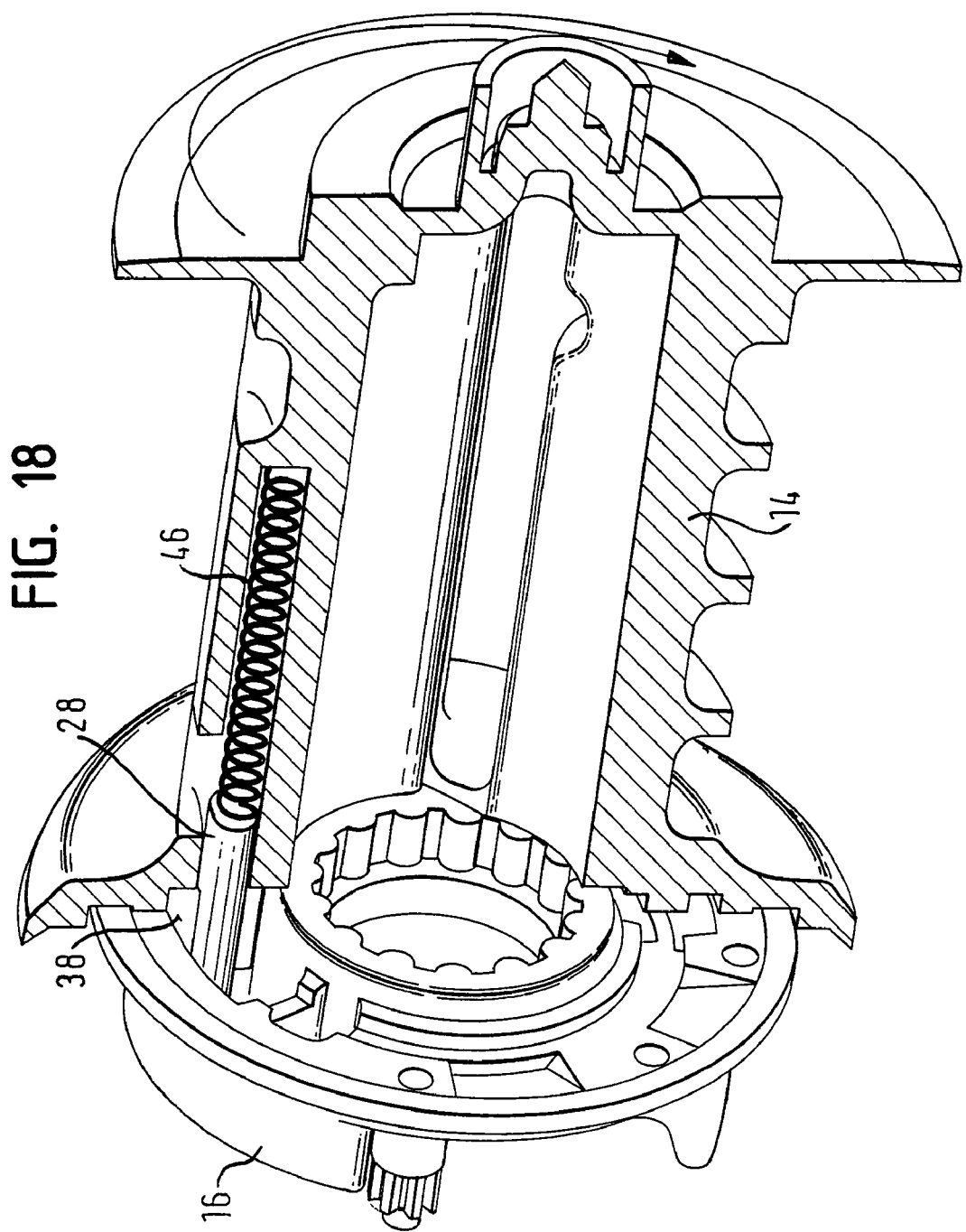
FIG. 18 shows a view corresponding to that of FIG. 16, the detent being in its operating position.

With the aid of FIGS. 16 to 18, a fourth embodiment is described. Here, also, a detent 28 is used, which makes possible approximately two revolutions of the belt spool 14 relative to the locking disc 16, before it comes to lie against a detent surface 38. In contrast to the preceding embodiments, in the fourth embodiment the detent 28 is moved solely by a compression spring 46.

In FIG. 16, the assembly consisting of belt spool 14 and locking disc 16 is shown in the initial state. The detent 28 rests against a part of the locking disc 16 which is adjacent to the detent surface 38. As can be seen, the detent 28 is provided at its end lying axially on the exterior with a spacer 50 which is distinguished in that it has a distinctly smaller cross-section than the actual detent 28. The length of the spacer 50 corresponds to the length of the detent surface 38, measured in axial direction, with which the detent 28 cooperates. In its initial position, the detent 28 rests via the spacer 50 against the locking disc 16. When the belt spool 14 turns in the direction of arrow P of FIG. 16 relative to the locking disc 16, the front end of the detent 28 slides over the locking disc 16 until the recess 36 is reached. Under the action of the compression spring 46, the detent 28 is pushed into the recess 16, more precisely the spacer 50. The latter, with continued relative rotation between the belt spool 14 and the locking disc 16, arrives in abutment against the detent surface 38 (see FIG. 17). With continued rotation, the spacer 50 is sheared off, so that the detent 28 with its then newly formed end face in turn lies against the inner side of the locking disc 16 facing the belt spool 14. After a further revolution of the belt spool 14 relative to the locking disc 16, the detent 28 reaches the recess 36 again, into which it is pushed under the action of the compression spring 46. Now the detent 28 arrives in abutment against the detent surface 38 (see FIG. 18). Owing to its larger cross-section and its high shearing resistance, resulting therefrom, the detent 28 now prevents a further rotation after the belt spool 14 has carried out two revolutions relative to the locking disc 16.

Figure 19:
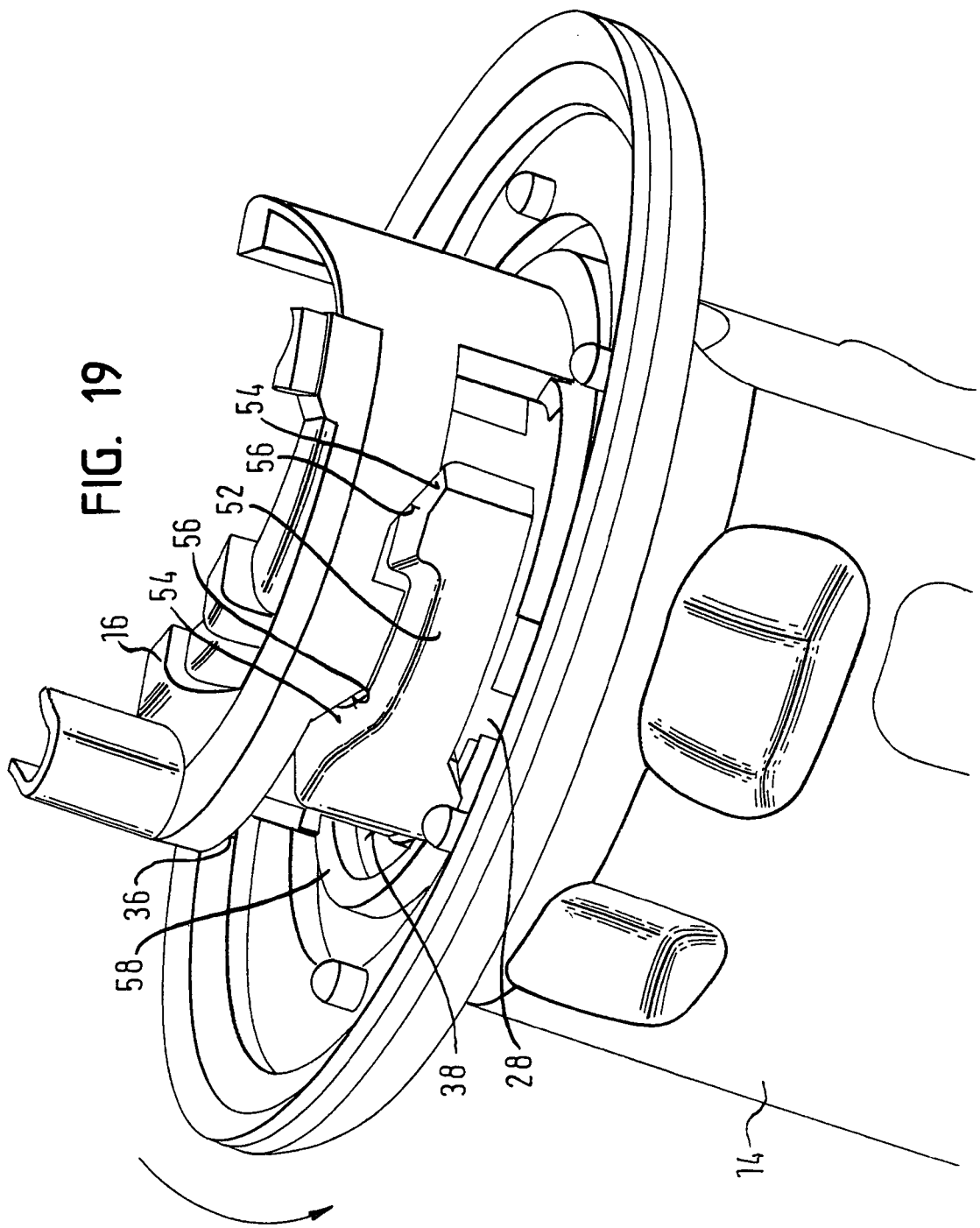
FIG. 19 shows in a perspective, enlarged view a detail of an assembly consisting of belt spool and locking disc for a belt retractor according to a fifth embodiment of the invention, the assembly being in its position of rest.
Figure 20:
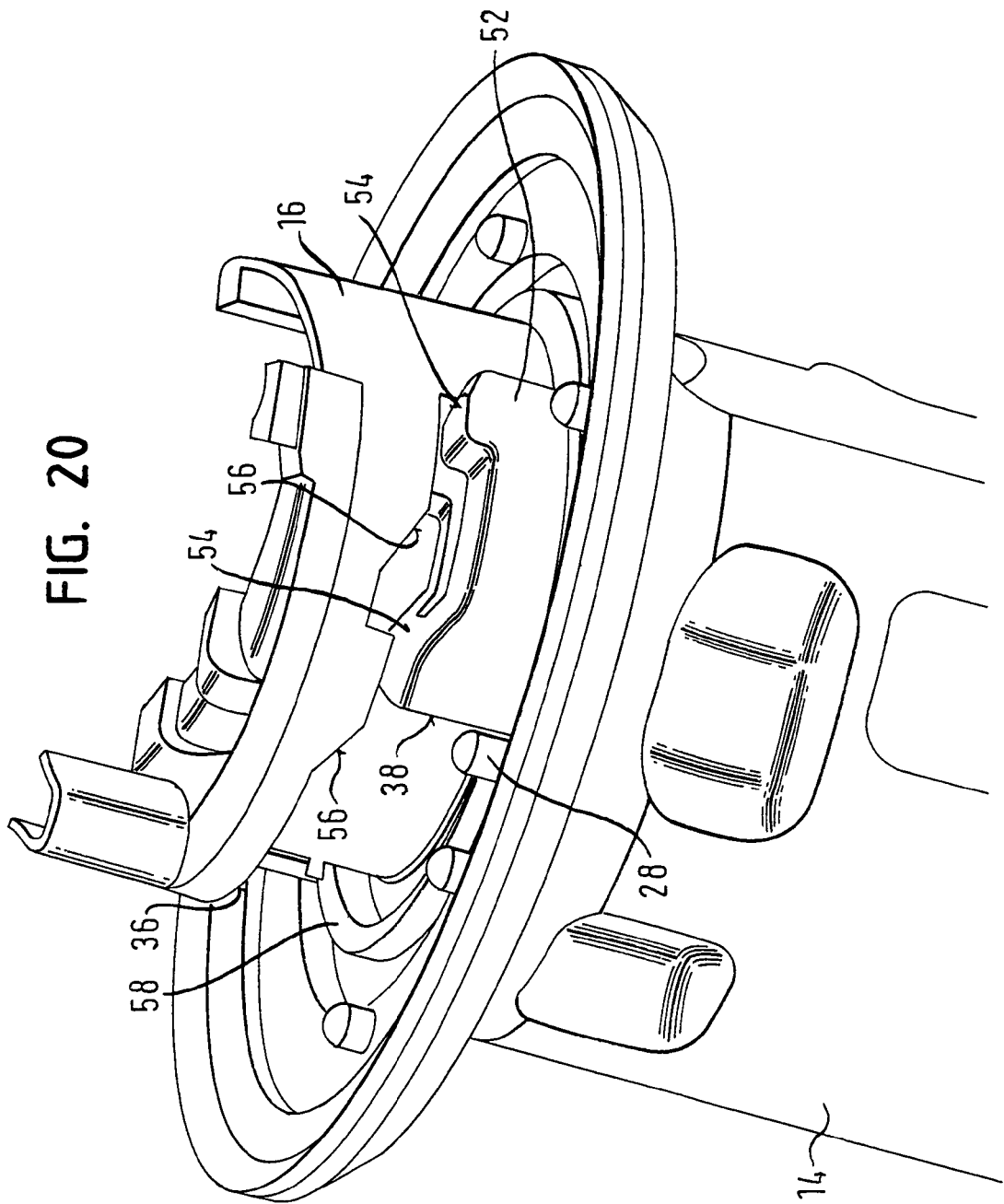
FIG. 20 shows a view corresponding to that of FIG. 19, the assembly being in its operating position.
Figure 21:
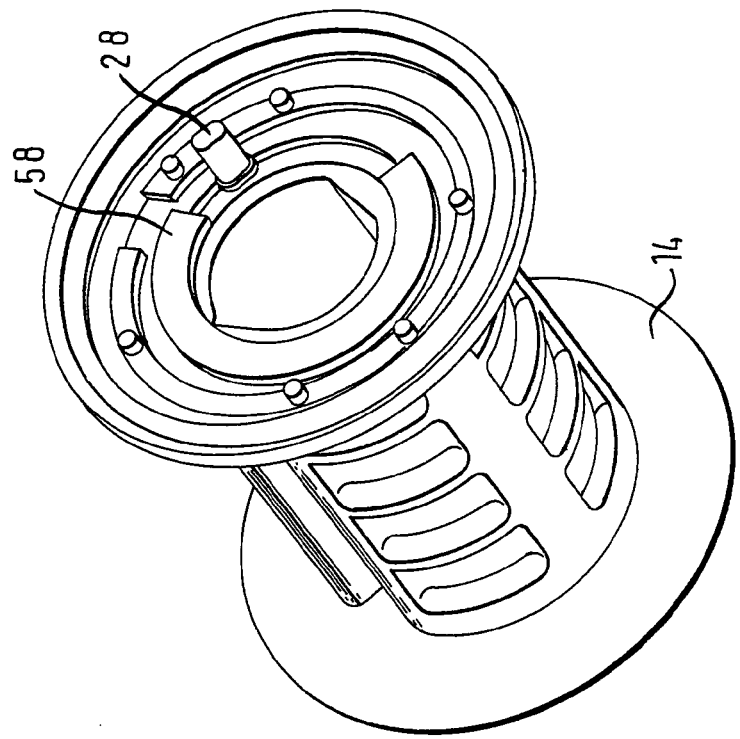
FIG. 21 shows in a perspective view a belt spool for a first variant of the belt retractor according to the fifth embodiment.

In FIGS. 19 to 21, a fifth embodiment is shown. The difference from the fourth embodiment consists firstly in that the detent surface 38 is not constructed as a fixed part of the locking disc 16, but rather is arranged on a cutting element 52 which is arranged movably on the locking disc 16. The locking disc 16 is provided with two slope surfaces 54 which can cooperate with associated oblique surfaces 56 on the locking disc 16. In the initial state (see FIG. 19), the cutting element 52, viewed in axial direction, is situated at a distance from the end face of the belt spool 14. From this position, it can be moved onto the oblique surfaces 56 so that it is moved towards the opposite end face of the belt spool 14 and can engage on a cutting cross-piece 58 (see FIG. 21) which rises in a helical shape on the end face of the belt spool 14.

In the initial state of the belt retractor (see FIG. 19), the detent 28 lies on the side of the cutting element 52 facing the belt spool 14. With a rotation of the belt spool 14 relative to the locking disc 16 in the direction of the arrow P (see FIG. 19), the detent 28 slides from the cutting element 52 onto the adjoining end face of the locking disc 16, until it dips after almost one revolution into the recess 36 lying in front of the detent surface 38 (see FIG. 20). With continued rotation of the belt spool 14 relative to the locking disc 16, the detent 28 arrives in abutment against the detent surface 38 on the cutting element 52. The detent 28 takes with it the cutting element 52, which slides with its sloped surfaces 54 on the oblique surfaces of the locking disc 16, until it has reached the position shown in FIG. 20. In this position, a cutting edge, constructed on the cutting element 52, engages on the cutting cross-piece 58, so that with a relative rotation of the belt spool 14 relative to the locking disc 16, the cutting cross-piece 58 is cut by the cutting element 52. Owing to the increasing height of the cutting cross-piece 58, the force necessary for cutting increases, so that after just one revolution at the latest, a further rotation of the belt spool 14 relative to the locking disc 16 is prevented.

Figure 22:
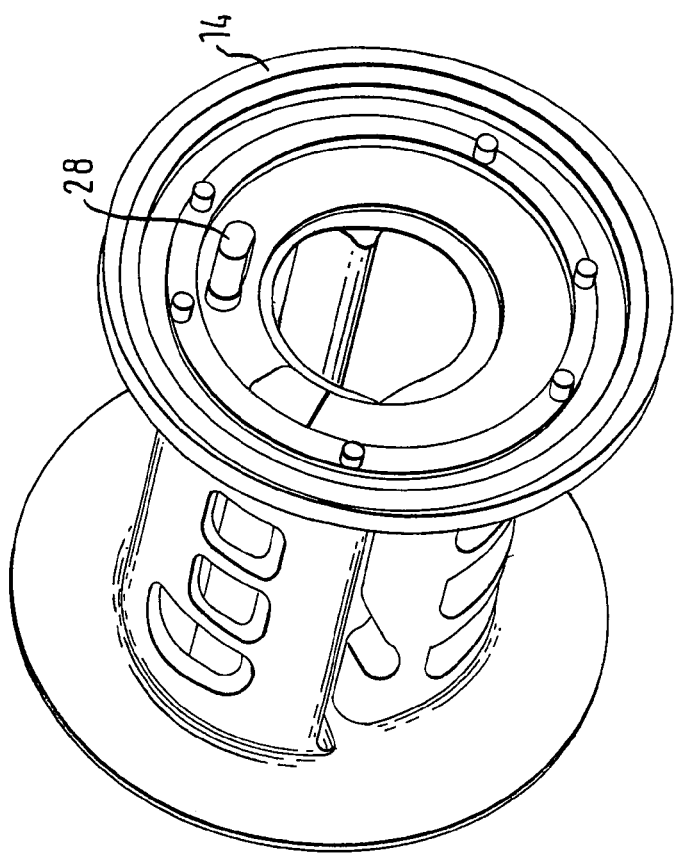
FIG. 22 shows in a perspective view a belt spool for a belt retractor according to a sixth embodiment.
Figure 23:
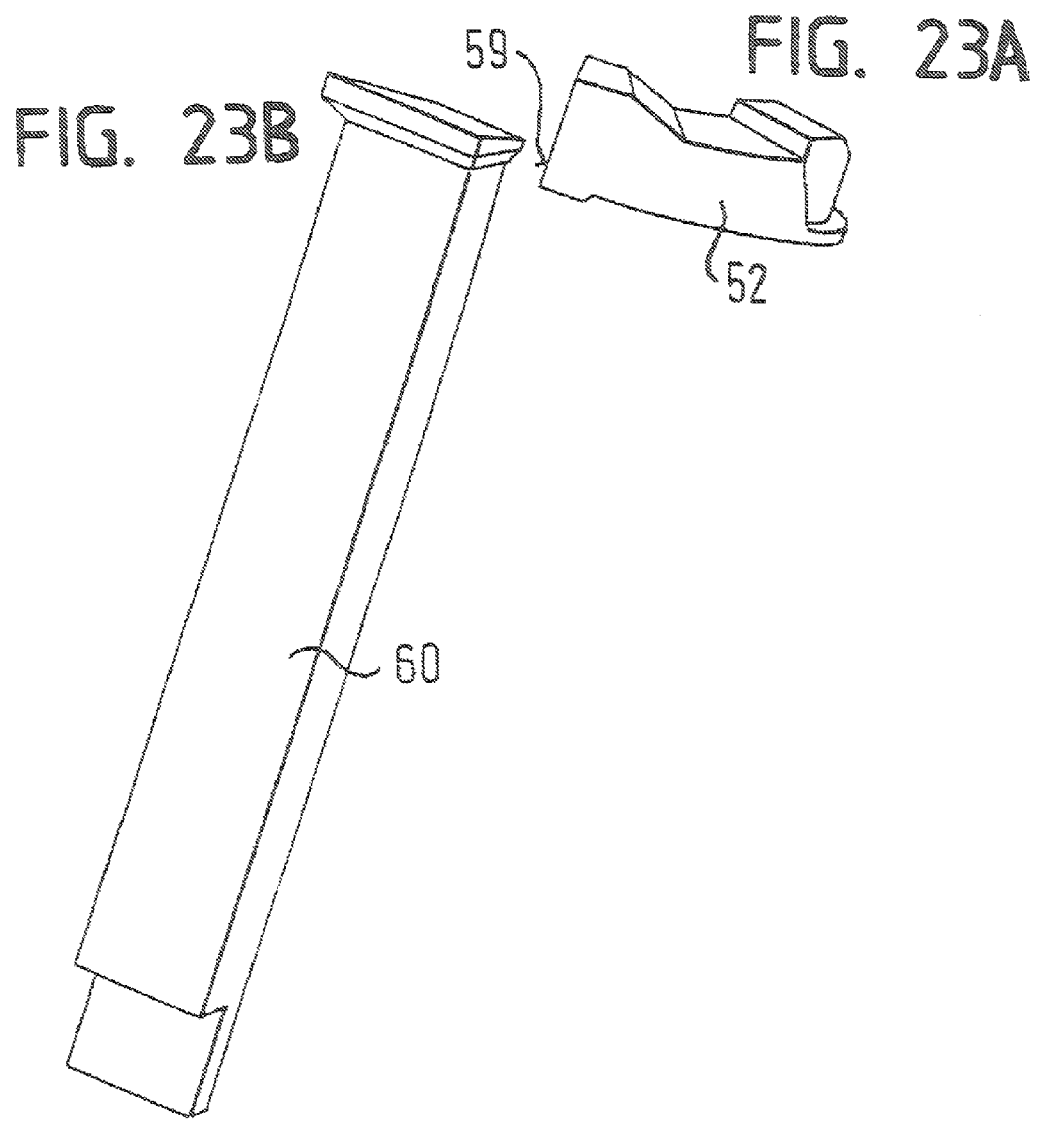
FIGS. 23A-23B show a stop element and a cutting element, respectively, used in the sixth embodiment.
Figure 24:
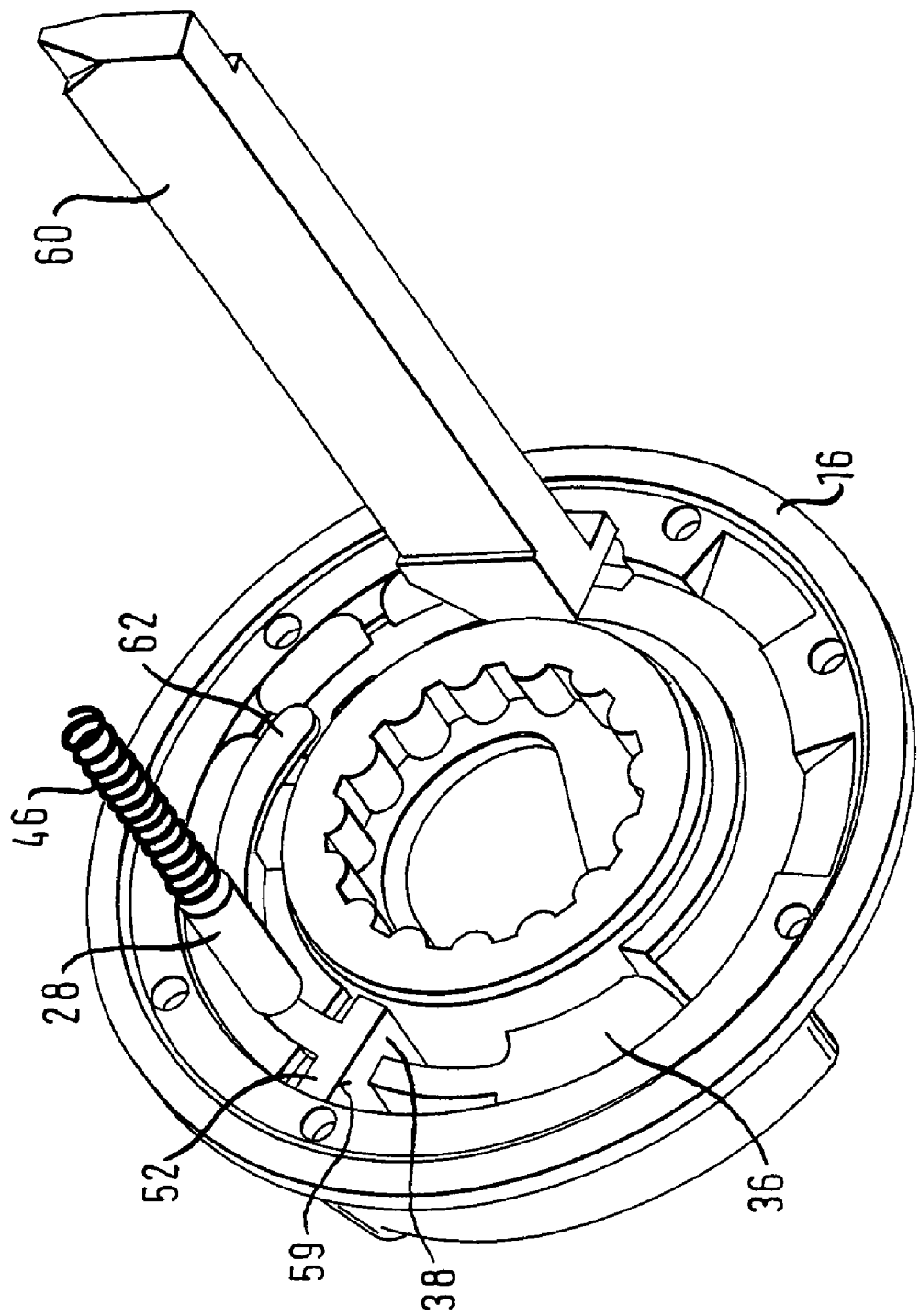
FIG. 24 shows in a perspective view the locking disc used in the sixth embodiment in cooperation with the detent and the stop element.

In FIGS. 22 to 24, a sixth embodiment of the belt retractor is shown. The difference from the previous embodiment consists in that a stop element 60 is provided, on which the cutting element 52 comes into abutment, after it has carried out just one revolution relative to the belt spool. The stop element 60 is constructed as an insert piece or impression piece of hardened metal, which has such a strength that it can not be cut by the cutting element 52. In FIG. 24, the position of the locking disc 16 with the cutting element 52 can be seen in the initial position. With a relative rotation of the belt spool relative to the locking disc 16, the detent 28 slides from the cutting element 52 (via a transition section 62 formed hereon) onto the end face of the locking disc 16. After dipping into the recess 36, the detent 28 arrives in abutment against the detent surface 38. Thereby, the cutting element 52 is moved. The relative rotation between the belt spool 14 and the locking disc 16 is limited after approximately two revolutions in that the cutting element 52 lies with its cutting edge 59 (see FIG. 23) against the stop element 60.

As can be seen in FIGS. 23A-23B, the cutting element 52 (FIG. 23A) is placed through approximately 10 degrees in its region adjoining the cutting edge 59 and cooperating with the stop element 60 (FIG. 23B). The same applies to the region of the stop element 60 cooperating with the cutting element 52. In this way, the cutting element 52 and the stop element 60 hook into each other, and no axial forces occur which could lead to a spreading effect between the belt spool 14 and the locking disc 16.

Figure 25:
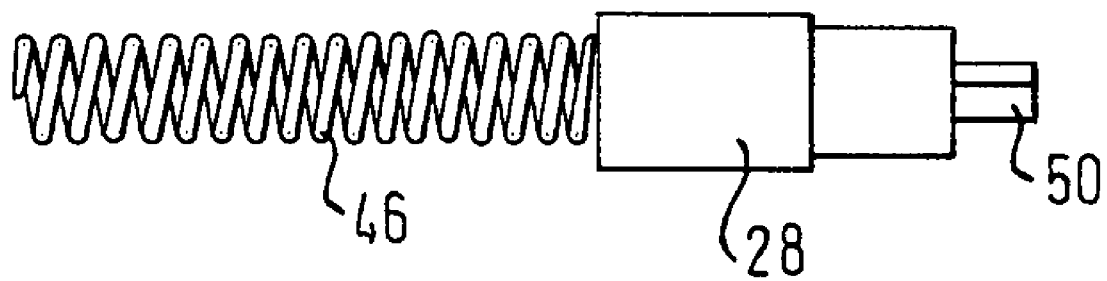
FIG. 25 shows diagrammatically a detent for a variant of the sixth embodiment.

In FIG. 25 a variant embodiment is shown, which differs from the preceding embodiment through the use of the spacer 50 at the end of the stop 28 facing the locking disc 16. The spacer 50 is dimensioned so thin that it can not move the cutting element 52 out from its initial position. The result of this is that as a whole three revolutions of the belt spool relative to the locking disc are possible. After the first revolution, the spacer 50 dips into the recess 36. After reaching the detent surface 38, it is sheared off. After the second revolution, the detent 28 enters into the recess 36. After reaching the detent surface 38, the cutting element is moved on the oblique surfaces, so that it engages on the end face of the belt spool 14. With the revolution of the belt spool 14 relative to the locking disc, following the second revolution, a part of the belt spool 14 is cut. The relative rotation ends either owing to the high resistance which the cutting cross-piece offers to the cutting element 52, or by abutment of the cutting element 52 against the stop element 60. Through a suitable combination of the resistance moment, which is provided by the cutting element 52 owing to the cutting work, together with the resistance moment provided by the torsion rod 18, a digressive, a progressive or else a constant characteristic of belt band withdrawal force can be achieved over the length of the withdrawn belt band during the force limitation function.

The invention claimed is:

1. A belt retractor for a vehicle safety belt, with a frame, a belt spool for a safety belt which is arranged rotatably in said frame, a locking disc which is arranged on said belt spool and is connected therewith through an energy absorption element, and a blocking mechanism to block said locking disc, wherein said locking disc can be blocked against a rotation in an unwinding direction of said safety belt in said frame, a detent being provided which is arranged movably in said belt spool and is for preventing a rotation of said locking disc relative to said belt spool as a function of the position of said detent, a control link being provided which cooperates with said detent in order to control a position of said detent, said control link controls movement of said detent into an intermediate position after a relative rotation between said locking disc and said belt spool of less than 360 degrees, and towards an operating position with a relative rotation between 540 degrees and less than 640 degrees.

2. The belt retractor according to claim 1, wherein said detent is acted upon by a spring into the operating position.

3. The belt retractor according to claim 1, wherein said detent is provided with a cam which cooperates with said control link.

4. The belt retractor according to claim 1, wherein said control link is provided with a transition section in which said detent is moved by a distance towards said locking disc which corresponds approximately to a material thickness of said control link plus a height of said detent.

5. The belt retractor according to claim 1, wherein said detent is rotatable with said belt spool relative to said frame and said locking disk.

6. The belt retractor according to claim 1, wherein said detent prevents rotation of said locking disc relative to said belt spool without deforming.

7. A belt retractor for a vehicle safety belt, with a frame, a belt spool for a safety belt which is arranged rotatably in said frame, a locking disc which is arranged on said belt spool and is connected therewith through an energy absorption element, and a blocking mechanism to block said locking disc, wherein said locking disc can be blocked against a rotation in an unwinding direction of said safety belt in said frame, a detent being provided which is arranged movably in said belt spool and is for preventing a rotation of said locking disc relative to said belt spool as a function of a position of said detent, said detent cooperates with a cutting element which is mounted on said locking disc and by cutting deformation of said belt spool counteracts a relative rotation between said locking disc and said belt spool, wherein said cutting element rests by means of at least one sloped surface against said locking disc.

8. A belt retractor for a vehicle safety belt, with a frame, a belt spool for a safety belt which is arranged rotatably in said frame, a locking disc which is arranged on said belt spool and is connected therewith through an energy absorption element, and a blocking mechanism to block said locking disc, wherein said locking disc can be blocked against a rotation in an unwinding direction of said safety belt in said frame, a detent being provided which is arranged movably in said belt spool and is for preventing a rotation of said locking disc relative to said belt spool as a function of a position of said detent, said detent cooperates with a cutting element which is mounted on said locking disc and by cutting deformation of said belt spool counteracts a relative rotation between said locking disc and said belt spool, wherein in addition a stop element is provided, against which said cutting element can come into abutment.

9. A belt retractor for a vehicle safety belt, with a frame, a belt spool for a safety belt which is arranged rotatably in said frame, a looking disc which is arranged on said belt spool and is connected therewith through an energy absorption element, and a blocking mechanism to block said looking disc, wherein said locking disc can be blocked against a rotation in an unwinding direction of said safety belt in said frame, a detent being provided which is arranged movably in said belt spool and is for preventing a rotation of said locking disc relative to said belt spool without deforming as a function of the position of said detent, a control link being provided which cooperates with said detent in order to control a position of said detent, said control link moves said detent into an intermediate position after a relative rotation between said locking disc and said belt spool of less than 360 degrees, and towards an operating position with a relative rotation of more than 360 degrees.

* * * * *